United States Patent
Fuchs et al.

(10) Patent No.: US 11,487,367 B1
(45) Date of Patent: *Nov. 1, 2022

(54) COMPUTER INPUT DEVICES HAVING TRANSLATIONAL AND ROTATIONAL DEGREES OF FREEDOM

(71) Applicant: Arkade, Inc., Centennial, CO (US)

(72) Inventors: Joshua Allan Fuchs, Granada Hills, CA (US); Joel Abraham Kort, Van Nuys, CA (US); Bob Steven Berns, Hidden Hills, CA (US)

(73) Assignee: Arkade, Inc., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,395

(22) Filed: Feb. 7, 2022

Related U.S. Application Data

(63) Continuation of application No. 17/329,703, filed on May 25, 2021, now Pat. No. 11,243,618.

(51) Int. Cl.
*G06F 3/0346* (2013.01)
*G06F 3/03* (2006.01)
*G06F 3/0354* (2013.01)

(52) U.S. Cl.
CPC .......... *G06F 3/0346* (2013.01); *G06F 3/0312* (2013.01); *G06F 3/03543* (2013.01); *G06F 3/03544* (2013.01)

(58) Field of Classification Search
CPC .. G06F 3/0346; G06F 3/0312; G06F 3/03543; G06F 3/03544
See application file for complete search history.

(56) References Cited

U.S. PATENT DOCUMENTS

| | | | |
|---|---|---|---|
| 5,512,920 A | 4/1996 | Gibson | |
| 6,618,038 B1* | 9/2003 | Bohn | G06F 3/04845 345/164 |
| 6,847,353 B1* | 1/2005 | Sasselli | G06F 3/0317 345/166 |
| 7,305,631 B1 | 12/2007 | Bort | |
| 11,132,070 B1 | 9/2021 | Fuchs et al. | |
| 2003/0189166 A1* | 10/2003 | Black | G06F 3/0317 250/221 |
| 2004/0212587 A1 | 10/2004 | Kong | |
| 2005/0093823 A1* | 5/2005 | Hinckley | G06F 3/0346 345/163 |
| 2005/0253806 A1 | 11/2005 | Liberty et al. | |
| 2006/0132438 A1* | 6/2006 | Oakley | G06F 3/03544 345/158 |
| 2007/0029464 A1 | 2/2007 | Chiu et al. | |

(Continued)

*Primary Examiner* — Ariel A Balaoing
(74) *Attorney, Agent, or Firm* — Volpe Koenig P.C.; Daniel E. Rose; Gerald Halt

(57) ABSTRACT

In some aspects, the disclosure is directed to methods and systems for an advanced computer input device with a rotational degree of freedom ($z_{rot}$) in addition to two translation degrees of freedom (x and y), in an easy and intuitive fashion. A plurality of independent position sensors may be arranged on a lower surface of the computer input device, each determining a direction and velocity of motion of the input device when in use. The detected directions and velocities may be compared to determine whether a rotational motion of the input device has been applied as opposed to (or in addition to) a translation.

19 Claims, 8 Drawing Sheets

(56) References Cited

U.S. PATENT DOCUMENTS

| | | | |
|---|---|---|---|
| 2007/0146325 A1* | 6/2007 | Poston | G06F 3/038 |
| | | | 345/163 |
| 2007/0150194 A1* | 6/2007 | Chirikov | G06F 3/0317 |
| | | | 701/500 |
| 2007/0222751 A1* | 9/2007 | Machida | G06F 3/03544 |
| | | | 345/163 |
| 2008/0018602 A1 | 1/2008 | Cheng et al. | |
| 2008/0062131 A1 | 3/2008 | Chan et al. | |
| 2008/0159088 A1* | 7/2008 | Simmons | G06F 3/0317 |
| | | | 369/44.14 |
| 2011/0080339 A1 | 4/2011 | Sun et al. | |
| 2012/0092257 A1* | 4/2012 | Chang | G06F 3/0317 |
| | | | 345/166 |
| 2012/0256837 A1* | 10/2012 | Chang | G06F 3/03543 |
| | | | 345/163 |
| 2016/0209936 A1 | 7/2016 | Song et al. | |
| 2018/0210565 A1* | 7/2018 | Chang | G06F 3/03544 |
| 2020/0012360 A1 | 1/2020 | Zhuang et al. | |

\* cited by examiner

|  | X- | 0 | X+ |
|---|---|---|---|
| Y+ | ↖ | ↑ | ↗ |
| 0 | ← | 0 | → |
| Y- | ↙ | ↓ | ↘ |

Detected direction

FIG. 1E

Sensor A

| Sensor B | | 0 | → | ↘ | ↓ | ↙ | ← | ↖ | ↑ | ↗ |
|---|---|---|---|---|---|---|---|---|---|---|
| | 0 | 0 | Z+ | Z+ | Error | Z- | Z- | Error | Error | Error |
| | → | Z- | 0 | Error | Z- | Z- | Z- | Error | Error | Error |
| | ↘ | Error | Error | 0 | Z- | Z- | Error | Error | Error | Error |
| | ↓ | Error | Error | Z+ | 0 | Z- | Error | Error | Error | Error |
| | ↙ | Error | Error | Z+ | Z+ | 0 | Error | Error | Error | Error |
| | ← | Z+ | Z+ | Z+ | Z+ | Z- | 0 | Error | Error | Error |
| | ↖ | Z+ | Z+ | Z+ | Z+ | Error | Z+ | 0 | Z+ | Z+ |
| | ↑ | Error | Z+ | Z+ | Error | Z- | Z- | Z- | 0 | Z+ |
| | ↗ | Z- | Error | Error | Z- | Z- | Z- | Z- | Z- | 0 |

FIG. 1F

COMPUTER INPUT DEVICES HAVING TRANSLATIONAL AND ROTATIONAL DEGREES OF FREEDOM

RELATED APPLICATIONS

The present application claims the benefit of and priority as a continuation to U.S. patent application Ser. No. 17/329,703, entitled "Computer Input Devices having Translational and Rotational Degrees of Freedom," filed May 25, 2021 and issued as U.S. Pat. No. 11,243,618 on Feb. 8, 2022, the entirety of which is incorporated by reference herein.

FIELD OF THE DISCLOSURE

This disclosure generally relates to systems and methods for input devices for electronic devices, such as computers. In particular, this disclosure relates to systems and methods for providing rotational data along with translation data for controlling a user interface having at least one rotational degree of freedom.

BACKGROUND OF THE DISCLOSURE

Software developers would frequently like to provide interfaces that allow further degrees of freedom for realism or greater control, such as three rotational degrees of freedom (pitch, roll, and yaw) for flight simulators, or three translational degrees of freedom (e.g. x, y, z) for control over camera positions within three-dimensional computer aided design (CAD) programs. However, computer input devices are typically limited to two degrees of freedom, such as x-axis and y-axis translations of a standard computer mouse; or are large, expensive, and unwieldy, such as joysticks with rotatable grips, or "3D mice", such as the Space Navigator manufactured by 3DConnexion of Munich, Germany, which provides six degrees of freedom through a pressure-sensitive knob or ball. Worse, while such joysticks and knobs may provide additional degrees of freedom beyond conventional mice, when used for translational degrees of freedom, they operate as rate-control devices rather than position-control devices, as with conventional mice. Specifically, position-control input devices directly change a position of a cursor according to the displacement of the input device—that is, move a mouse a particular distance and the cursor moves a corresponding distance. Joysticks and 3D knobs, on the other hand, change the speed and direction of the cursor according to their rotation—that is, if the joystick is held to one side, the cursor will continuously move in that direction at a corresponding speed (until encountering an edge, or potentially "wrapping around", depending on the user interface). This may be less intuitive and difficult to use in instances where accuracy is important, such as clicking on small buttons in a user interface, "first-person shooter" video games, drawing programs, etc. Other input devices, such as graphics tablets and styluses, touchpads, and tracked motion controllers (e.g. the Wii Remote or "Wiimote" wireless motion controller manufactured by the Nintendo corporation of Kyoto, Japan.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1E is a key of symbols for detected directional motion for the chart of FIG. 1F;

FIG. 1F is a chart illustrating an example of directions of rotation according to various sets of detected directional motions for a pair of sensors of an implementation of a computer input device;

Figure 1A:
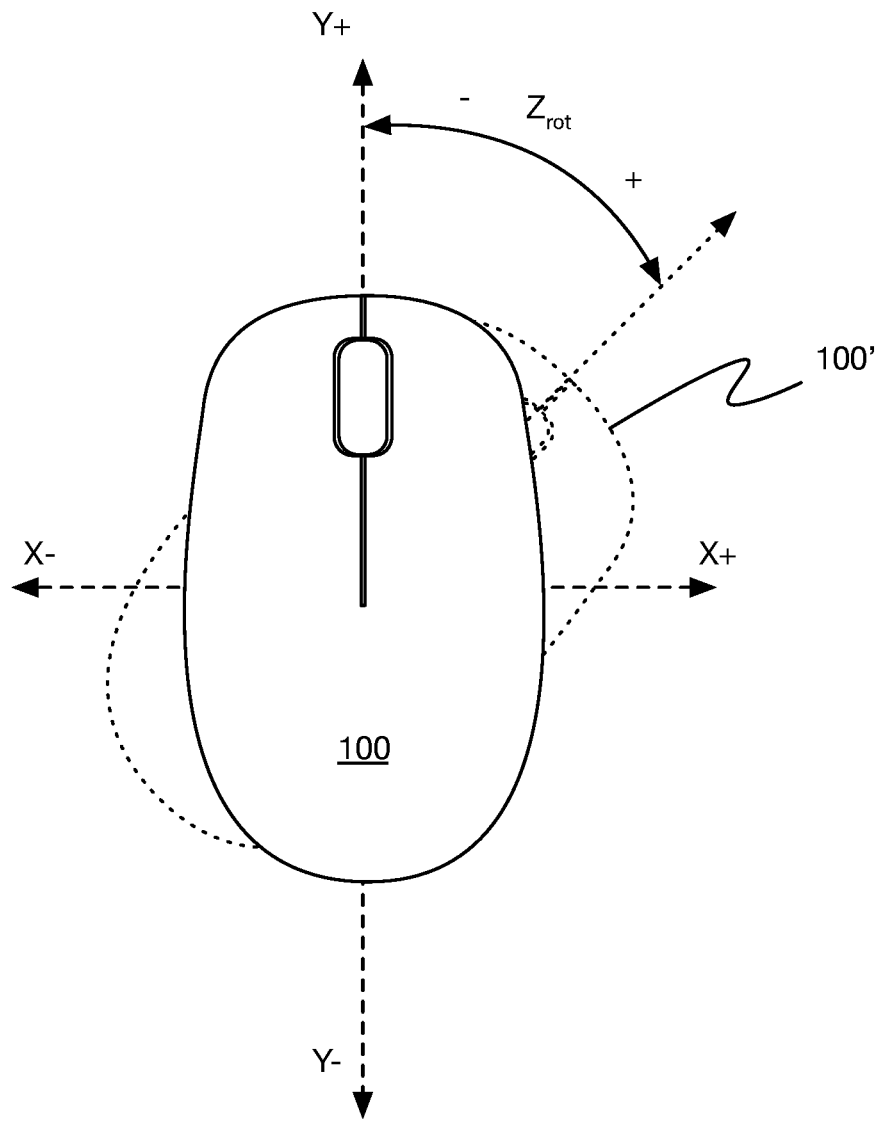
FIGS. 1A and 1B are top and bottom views, respectively, of an implementation of a computer input device having a rotational degree of freedom.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for advanced computer input devices having rotational and translation degrees of freedom; and Section B describes a computing environment which may be useful for practicing embodiments described herein.

A. Computer Input Devices Having Rotational and Translation Degrees of Freedom

Computer input devices such as mice are typically limited to two degrees of freedom, such as x-axis and y-axis translations of a standard computer mouse. This can be limiting for developers wishing to provide a greater range of controls, and also impair realism in simulations. Other input devices, such as joysticks or 3D mice, allow for more degrees of freedom, but are limited to rotational degrees (e.g. pitch, roll, and yaw). While these inputs may be mapped to translations (e.g. left and right on a joystick, typically used for roll, being instead used to move a cursor left and right), because joysticks and 3D mice are rate-control devices, they tend to be inaccurate, less intuitive, and slower to move than position-control input devices such as conventional mice. For example, to aim a cursor at an interface element across the monitor from a current position, a user may easily and intuitively move a conventional mouse in the direction of the target for a distance proportional to the distance to be covered by the cursor on the monitor. By contrast, to aim a cursor at an interface element using a joystick, a user may need to push the joystick to an extreme tilt in a direction, and then hold that position as the cursor accelerates to a predetermined speed. Worse, if a user overshoots a target with a conventional mouse, they may simply move their hand back slightly to realign the cursor with the target; but with a joystick, a user approaching a target from the left and overshooting the target would need to move the joystick from a right tilt all the way back through zero to a left tilt. This is significantly slower.

Instead, the advanced computer input device described herein addresses these issues by adding a rotational degree of freedom to the standard two translation degrees of freedom (x and y) of a traditional mouse, in an easy and intuitive fashion. A plurality of independent position sensors may be arranged on a lower surface of the computer input device, each determining a direction and velocity of motion of the input device when in use. The detected directions and velocities may be compared to determine whether a rotational motion of the input device has been applied as opposed to (or in addition to) a translation. In some implementations, the additional sensors may also provide greater accuracy for translation detection, for example by averaging sensor data, or by disregarding sensor data that may be erroneous (e.g. a loss of detection of motion during a translation, such as due to dust or debris blocking a sensor).

Figure 1B:
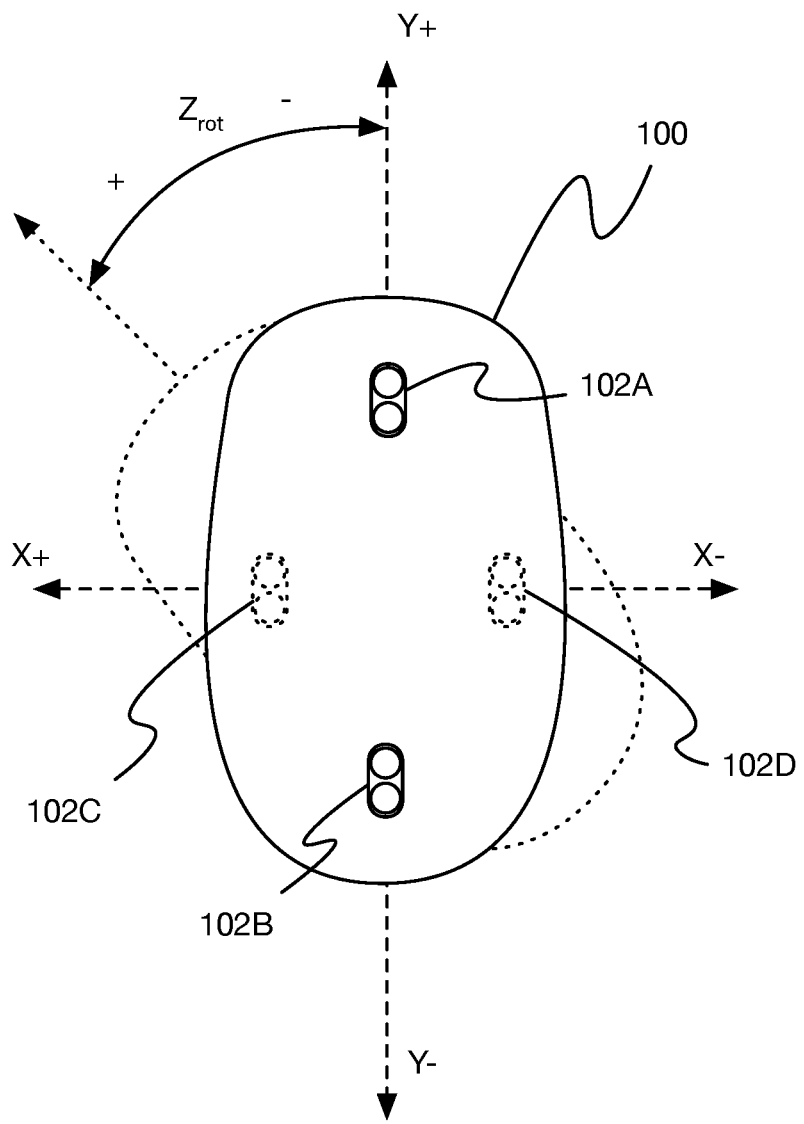

FIGS. 1A and 1B are top and bottom views, respectively, of an implementation of a computer input device 100 having a rotational degree of freedom ($Z_{rot}$, or rotation around the z-axis perpendicular to the page) and two translational degrees of freedom (X±along the x-axis to the left and right, and Y±along the y-axis up and down). The axes are labeled for convenience, but different axes may be utilized in various implementations (e.g. a translational Z axis could be utilized in place of a Y axis, or a rotational X axis could be utilized in place of the translational X axis, such as turning a view left and right within a three dimensional environment). As shown in the bottom view of FIG. 1B, the input device 100 may comprise a plurality of sensors 102A-102D (or additional sensors not illustrated) referred to generally as sensor(s) 102. The plurality of sensors may be spaced at locations separated from a centroid of the input device. When the input device 100 is rotated around the z-axis ($Z_{rot}$), the centroid may remain in approximately the same position while the sensors 102 move an amount proportional to their distance from the centroid. For example, when rotating the input device in the positive $Z_{rot}$ direction, sensor 102A may show a large movement in the positive X direction and negative Y direction, while sensor 102B shows a similar movement in the negative X direction and positive Y direction. These distances and directions may be compared in order to detect a rotation of the input device 100. Advantageously, the sensors 102 also provide translation detection, avoiding the need for additional dedicated sensors to detect rotation (e.g. balls, coils, wheels, inertial measurement units, accelerometers, etc.).

Although shown symmetrically positioned across the bottom surface of the controller 100, other arrangements are possible. For example, the sensors 102 may be positioned on one side or another of a centerline of the controller. Additionally, although shown with pairs, different numbers of sensors are possible. For example, in some implementations, three sensors may be positioned across the bottom surface of the controller (e.g. in an equilateral or isosceles triangle).

Figure 1C:
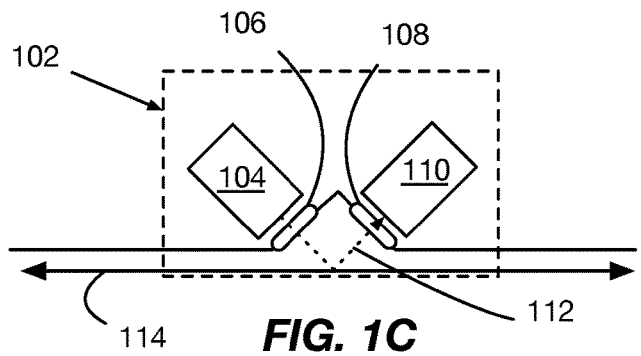
FIG. 1C is a cross-section view of a sensor for an implementation of a computer input device.

Referring briefly to FIG. 1C, illustrated is a cross-section view (not to scale) of a sensor 102 for an implementation of a computer input device 100. The sensor 102 may comprise an optical or infrared sensor 110 and, in many implementations, may include a corresponding optical or infrared emitter 104 (e.g. LED or OLED illuminator, a laser, etc.). In some implementations, the sensor and optional emitter may be uncovered, while in other implementations an emitter cover or lens 106 and sensor cover or lens 108 may be employed (e.g. as a translucent cover for protection of sensor 110 and emitter 104, or as curved lenses to properly focus light 112 from emitter 104 on sensor 110). As shown, light 112 from emitter 104 may be reflected off surface 114 and received by sensor 110 to illuminate the surface and detect changes in successive images of the surface to determine motion. For example, in some implementations, sensor 110 may comprise an X-Y array of image sensors (e.g. a CCD, CMOS sensor, etc.), and may take successive images of the illuminated surface at a predetermined frequency. These images may be compared to determine an amount and direction of motion (e.g. a translation or motion vector between the two images) at the predetermined frequency, allowing for calculation of a two-dimensional vector proportional to the velocity.

Figure 1D:
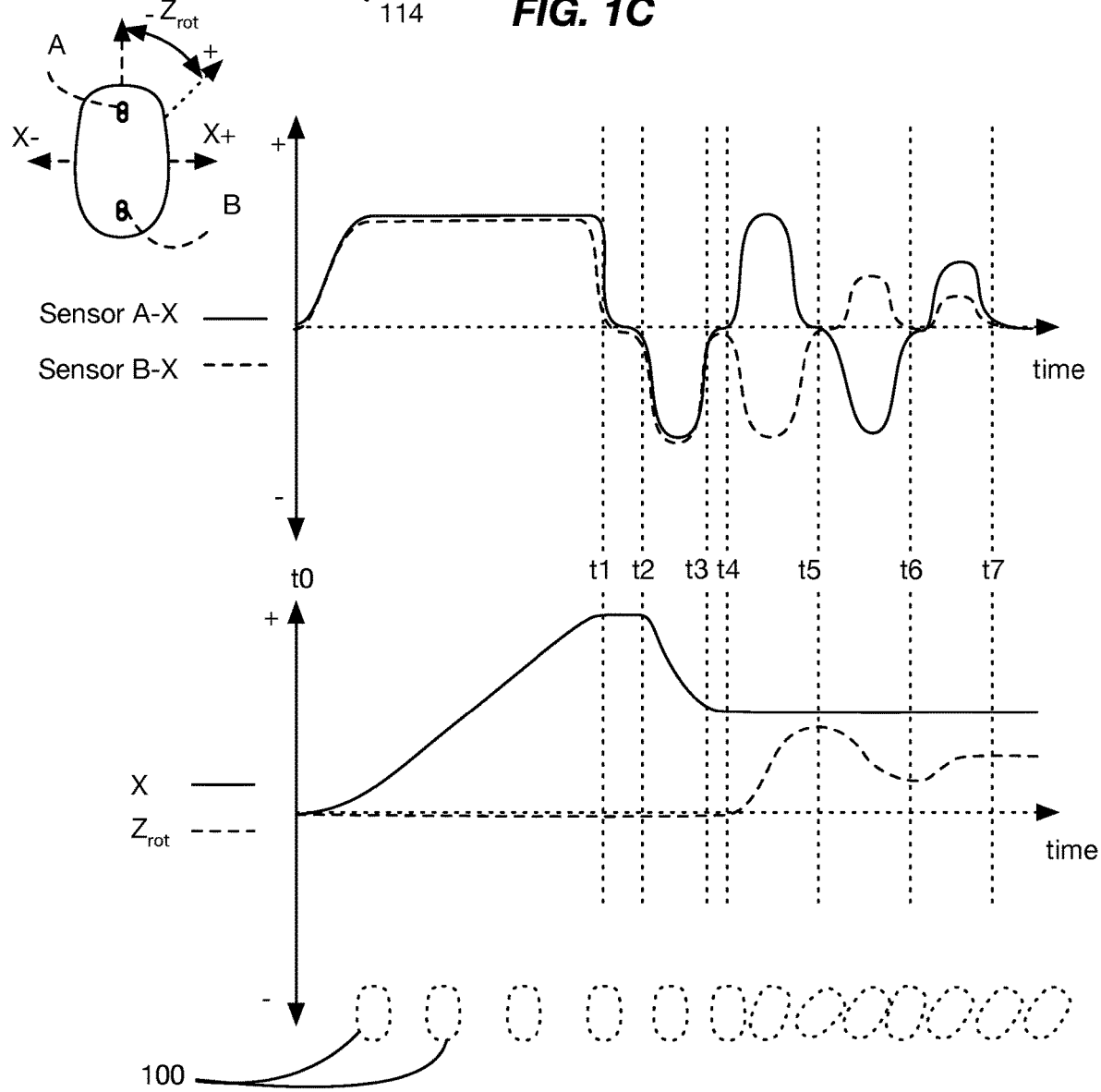
FIG. 1D is a graph illustrating an example of sensor inputs and corresponding translational and rotational movement for an implementation of a computer input device.

As discussed above, outputs of different sensors may be compared to detect rotation of the input device. For example, FIG. 1D is a graph illustrating an example of sensor inputs and corresponding translational and rotational movement (not to scale) for an implementation of a computer input device. The key shown at upper left illustrates a top-down view of an input device 100, positive and negative directions along the X axis, as well as positive and negative rotation directions around the Z axis. The key also identifies a first sensor (A) near the top of the input device and a second sensor (B) near the bottom of the input device (although visible in the illustration for explanation purposes, the sensors would be on the bottom of the input device and not visible in most implementations).

For clarity and ease of explanation, only the X-axis outputs of sensors A (solid line) and B (dashed line) are shown in the top graph. Similarly, only X-axis translations (solid line) and Z-axis rotations (dashed line) are illustrated in the bottom graph. Both graphs are time-aligned.

As shown in the top graph, from t0-t1, both sensors A and B detect a velocity to the right (X+) that ceases at t1. At t2-t3, both sensors detect a velocity to the left. As shown in the bottom graph, from t0-t1, the input device is moved to the right (X+); at t1-t2, the input device is stationary; and at t2-t3, the input device is moved back to the left, albeit less than the amount moved to the right at t0-t1.

As shown in the top graph, at t4-t5, sensor A detects a velocity to the right (X+) while sensor B detects a velocity to the left (X−). This represents a rotation around a position between the two sensors (e.g. the centroid of the input device). As shown in the bottom graph, from t4-t5, the input device is rotated clockwise (see also dashed-line images of input device 100 beneath the graphs, illustrating corresponding rotational orientations at the noted times).

In many implementations, rotation of the input device may not be perfectly centered at the centroid or position between the sensors. This may result in still-detectable differences in sensor outputs, albeit with different amplitudes. For example, from t5-t6 in the upper graph, sensor A detects a large velocity to the left, while sensor B detects a smaller velocity to the right. As shown in the lower graph, this may be identified as a counter-clockwise rotation, albeit not around the centroid of the input device, and accordingly may be identified as a smaller rotation. Similarly, in some implementations, both sensors may detect a velocity in the same direction (e.g. X+ at t6-t7) with different amplitudes. This may be similarly interpreted as a clockwise rotation as shown, with a slight movement to the right of the lower portion (in the Y direction) of the input device and a large movement to the right of the upper portion (in the Y direction) of the input device.

Although shown stationary from t5-t7 in the lower graph, in some implementations, rotations not around the centroid of the input device may be interpreted as simultaneous rotations and translations. For example, in one such implementation, rather than being stationary from t6-t7, the input device may detect an overall velocity to the right (X+), coupled with a clockwise rotation.

The velocities detected from different sensors may be correlated to determine an overal rotation, as shown in the chart of FIG. 1F. Referring first to FIG. 1E, illustrated is a key of symbols for detected directional motion from a sensor. For example, if a sensor detects a translation to the right (X+) and up (Y+), the combined vector may be up and right, as shown in the upper right cell of the key. The key is simplified for convenience and does not illustrate relative amplitudes and resulting vector angles.

The vector symbols are used in the chart of FIG. 1F, which illustrates an example of directions of rotation according to various sets of detected directional motions for a pair of sensors (e.g. sensor A at the top of an input device and sensor B at the bottom of the input device, as shown in FIG. 1D) of an implementation of a computer input device 100. As shown in the chart, if sensor A detects a translation to the right and sensor B detects no translation, the result may be interpreted as a clockwise rotation (Z+). Similarly, if sensor A detects a translation up and to the left, and sensor B detects a translation up and to the right, the result may be interpreted as a counter-clockwise rotation (Z−).

As shown, several combinations of detected velocities may be interpreted as errors. For example, because the sensors are at fixed positions relative to each other, if sensor A detects a velocity up (Y+) and sensor B detects an opposing velocity down (Y−), one or both readings must be erroneous (e.g. due to dust or debris on a lens of a sensor). In some implementations, in case of error, a previously identified direction of rotation or translation may be utilized (e.g. during a previous imaging and comparison cycle). This may be particularly useful where the change in velocity vectors in subsequent cycles (e.g. the derivative or acceleration between successive vectors) is very high, suggesting an error. For example, if a series of images taken microseconds apart show a consistent translation velocity to the right and a subsequent image shows a sudden velocity to the left, the acceleration in the X− direction indicated by the sensor may be huge. If this acceleration exceeds a threshold, in some implementations, the new velocity reading may be disregarded. Advantageously, with a plurality of sensors, if an erroneous velocity detected by one sensor is disregarded, the velocity detected by another sensor may be utilized to move a cursor, providing seamless error recovery and high reliability and accuracy.

Figure 1G:
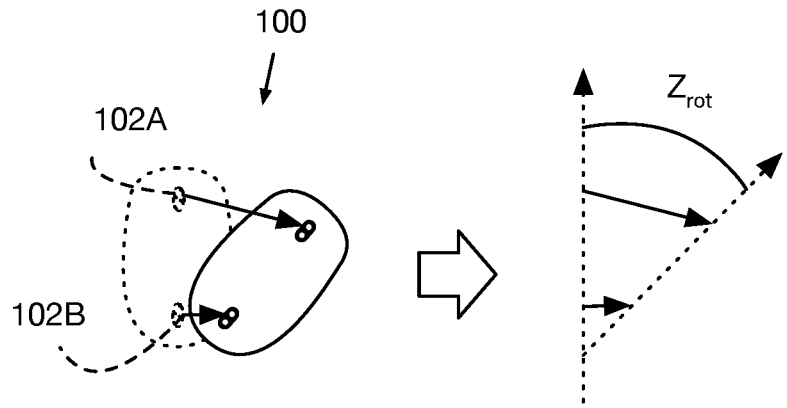
FIG. 1G is an illustration of measurement of rotational motion of an implementation of a computer input device.

In another implementation, sensor vectors and a known distance between the sensors and edges of the input device may be utilized to accurately measure rotation of the input device. FIG. 1G is an illustration of measurement of rotational motion of an implementation of a computer input device 100. As shown, sensors 102A, 102B may each detect a movement (corresponding arrows). Because the distance between these sensors is known, as well as the positions of the sensors on the input device, a resulting rotation of the input device may be calculated as a function of vector translations and their moments around the centroid of the input device.

Figure 2:
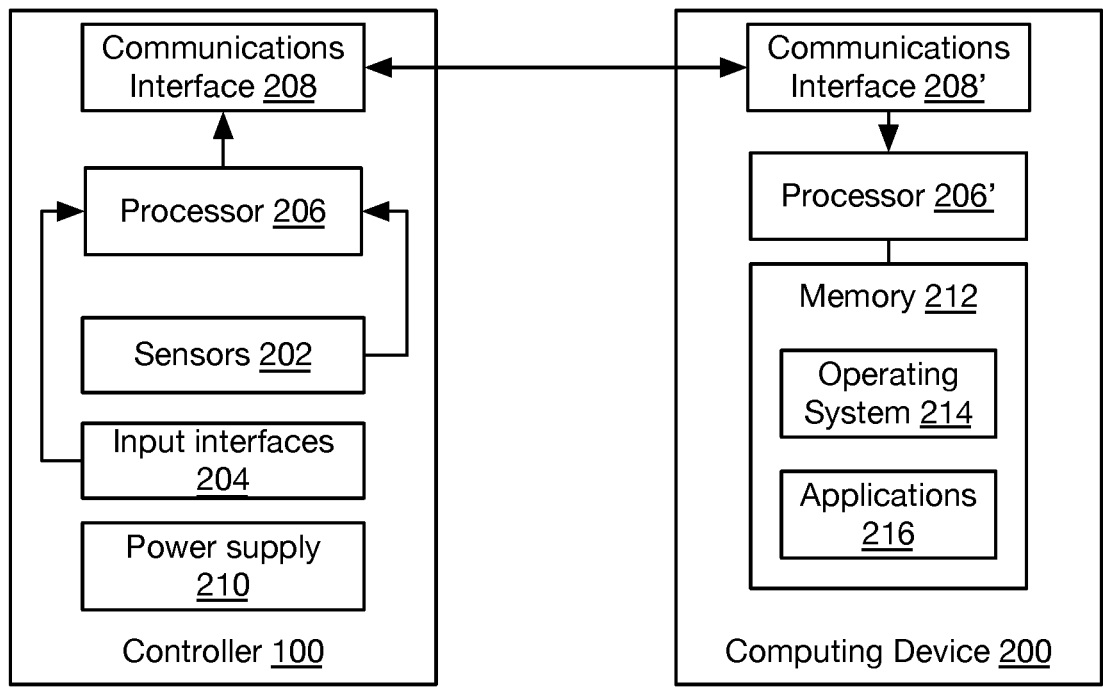
FIG. 2 is a block diagram of an implementation of a computer input device and computing environment.

FIG. 2 is a block diagram of an implementation of a computer input device 100 and computing environment, including a second computing device 200, such as a desktop computer, laptop computer, workstation, console, tablet computer, appliance, or other electronic device. In many implementations, a controller 100 may comprise some or all of a plurality of sensors 202, one or more input interfaces 204 (e.g. buttons, scroll wheels, touch-sensitive surfaces, etc.), a processor or processors 206, one or more communications interfaces 208, and a power supply 210.

Still referring to FIG. 2 and in more detail, in some implementations, a controller 100 may comprise a plurality of sensors 202, which may comprise sensors 102 as discussed above. In some implementations, sensors 202 may comprise CMOS image arrays of a given size (e.g. 16×16, 8×8, 32×32, or any other such size and shape), and may include illuminators or emitters such as laser diodes, infrared LEDs, etc. Because a plurality of sensors are used in combination, in some implementations, an imaging array may be rectangular in shape. For example, rather than a square array, an image array may be 8×16, 16×32, etc. While this may reduce resolution in one direction, because pairs of sensors are used to detect motion, the resulting sensor outputs may be used in combination to determine motion in those reduced-resolution directions at a higher resolution than provided by a single sensor. For example, given a controller 100 with two image sensors of 8×16 pixels, with the 8 pixels oriented along the Y axis, if the controller is moved upwards (e.g. in the Y+ direction), one sensor may detect movement of one pixel within the imaging time period, while the other sensor does not detect any movement. The output of the sensor detecting movement may be utilized and the non-movement detecting sensor signal disregarded. This effectively doubles the resolution of the sensors. In a similar example, if one sensor detects movement of 3 pixels and the other sensor detects movement of 1 pixel, these output values may be averaged and a movement of 2 pixels during the imaging time period provided to the computing device, again effectively doubling the resolution. This may be particularly valuable for sensor pairs that are aligned along an axis (e.g. using arrays that are shorter in the Y direction for sensors aligned on the Y-axis of the controller, or arrays that are narrower in the X direction for sensors aligned on the X-axis of the controller). Such implementations may allow for reduced cost in manufacturing and utilization of arrays with manufacturing errors at the edges that would otherwise be discarded as waste.

In addition to optical sensors 202, in some implementations, controller 100 may include additional sensors, such as inertial measurement units, accelerometers, three-dimensional orientation sensors, magnetic sensors, or mechanical sensors. For example, in some implementations, controller 100 may include a pair of optical sensors and an X-Y accelerometer.

Controller 100 may also include one or more input interfaces 204, such as buttons, scroll wheels, thumbwheels, joysticks, directional pads, paddles or rocker switches, touch-sensitive surfaces (e.g. resistive or capacitive touchpads), fingerprint scanners, or other such input interfaces. Triggers detected from each interface may be provided to a computing device 200 via a human interface device (HID) driver, such as mouse clicks (e.g. click down and click up) events, taps, drags, double-clicks, directional buttons, etc.

Controller 100 may include a processor 206. Processor 206 may comprise any type and form of processor, and in many implementations, may comprise an application-specific integrated circuit (ASIC) or field-programmable gate array (FPGA) configured to receive sensor signals, correlate the signals to determine translations and/or rotations, and provide the signals via a communication interface 208 to a computing device 200. Processor 206 may also control one or more output devices (not illustrated) such as LEDs for battery or communication status, aesthetic appearance, or button indications, as well as dynamically powering an emitter (e.g. reducing emitter power when the controller is not being moved).

Communications interface 208 may comprise any type and form of interface, such as a USB interface, Bluetooth interface, WiFi interface, etc., and may comprise corresponding hardware (e.g. wireless transmitters, physical ports, etc.). In many implementations, a controller may include multiple communications interfaces 208, such as a Bluetooth interface for wireless use and a USB interface for wired use. For wireless implementations, controller 100 may comprise a power supply 210 such as a rechargeable or replaceable battery.

Communications interface 208 of the controller 100 may communicate wirelessly or via a physical connection (e.g. USB cable) with a corresponding communications interface 208' of a computing device 200, which may include several such communications interfaces. Computing device 200 may similarly comprise one or more processors 206'. Computing device 200 may also include a memory device 212, which may store an operating system 214 for execution by processor 206' as well as one or more applications 216. User interfaces may be provided by the operating system 214 and/or applications 216, which may include movable cameras, cursors, or selectable interface elements such as buttons, scroll bars, or other such entities. The operating system 214 may comprise a human interface device (HID) driver for interpreting signals from the controller 100, such as movement or detected translation velocities (e.g. in the X or Y directions) as well as rotations (e.g. around the Z axis, or any other axis, depending on configuration).

Figure 3:
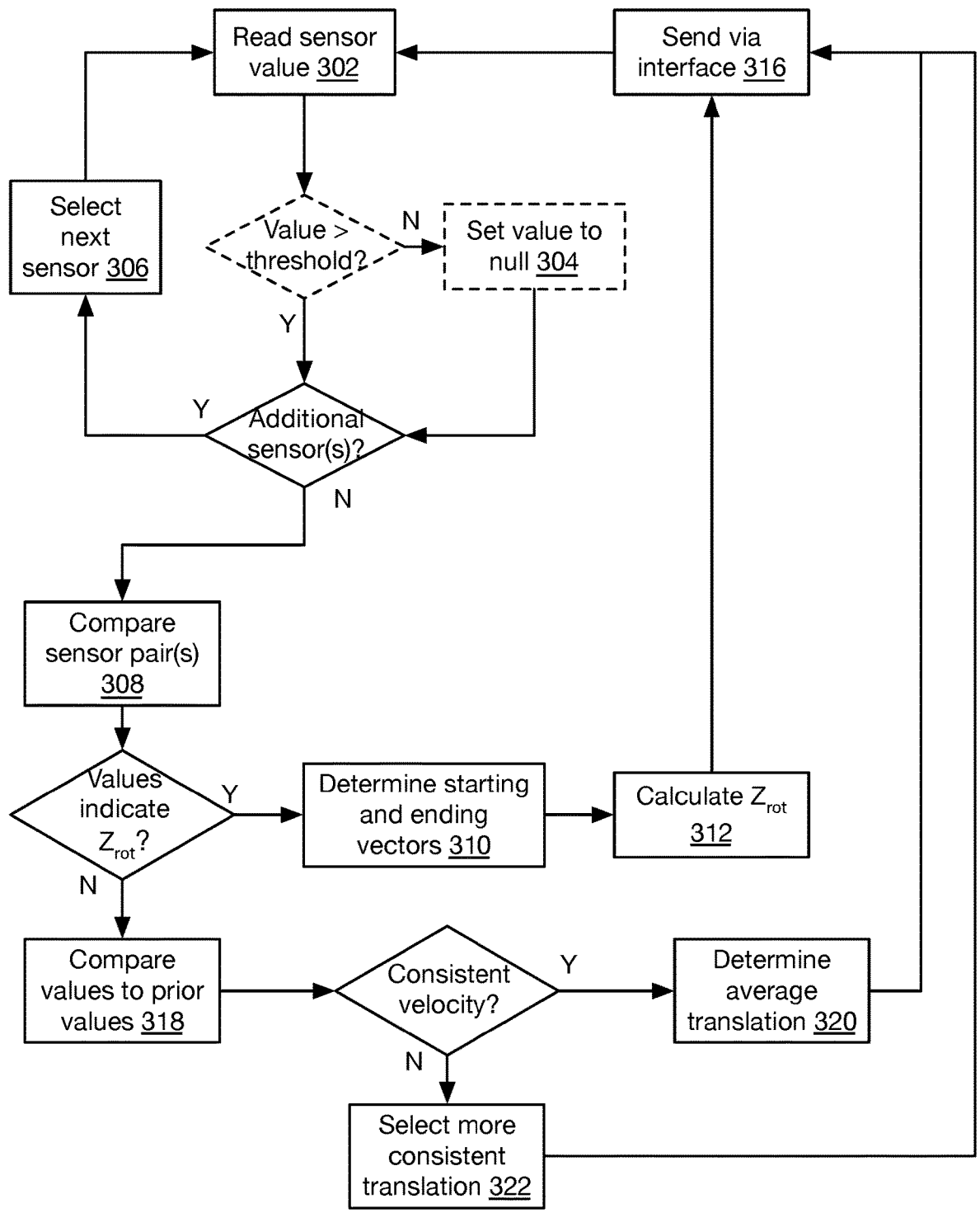
FIG. 3 is a flow chart of an implementation of providing translational and rotational motion values for an implementation of a computer input device.

FIG. 3 is a flow chart of an implementation of providing translational and rotational motion values for an implementation of a computer input device. At step 302, a processor of the controller may read a value from a sensor, such as an optical sensor or imaging CMOS sensor. Although referred to as a value, in many implementations, the "value" may be a processed value such as a velocity vector (e.g. x and y coordinates) representing a velocity detected by the sensor over a predetermined imaging period (e.g. 1 millisecond, 1 microsecond, etc.). In some implementations, the images may be processed by the processor, while in other implementations, the images may be processed by a dedicated co-processor (e.g. ASIC performing digital image correlation).

Optionally, in some implementations, to avoid false readings, the velocity vector or value may be compared to a threshold, and if the value is less than the threshold, at step 304, the value may be set to 0 or null (providing a "dead zone" for movement, and avoiding jitter from very slight detected movements of the controller). In other implementations, the value may be compared to another (e.g. upper) threshold, and if the value is greater than the threshold, the value may be set to 0 or null (e.g. avoiding errors from false positives or detected motion that is unlikely to be realistic, on the orders of meters per second or more). In still other implementations, these steps may be skipped.

If there are additional sensors, then at step 306, the next sensor selected and values read or images correlated at steps 302-304.

At step 308, velocity vectors from different sensors may be compared, and particularly sensors in predetermined positions or in opposition to each other around a centroid of the controller. As discussed above, comparing the vectors may comprise comparing both direction and amplitude of the vectors. Vectors in opposing directions may indicate a rotation, or may indicate an erroneous input, depending on the specific directions, as discussed above. If the directions and amplitudes indicate a potential rotation, then at step 310 in some implementations, starting and ending vectors may be determined for the sensors, and at step 312, a rotation of the controller around the z-axis may be calculated (e.g. a rotation of a line through the sensors and centroid of the controller in an initial position to a second position through the sensors' new locations and the centroid, according to each sensor's determined velocity vector). In some implementations, this may be done by calculating an inverse tangent of a slope of a line through the ending positions of each sensor relative to a previous position (e.g. $\tan \theta = (Ax-Bx)/(Ay-By)$). In other implementations, other methods may be utilized (e.g. determining a resultant vector for the centroid based on each sensor's vector and its distance from the centroid, etc.). At step 316, this rotation may be transmitted via a communication interface to a computing device. Although representing a rotation around the z-axis of the controller, this axis may be mapped by an operating system or application of the computing device to another axis. For example, the rotation may be used for roll, rotation of a control surface (e.g. a rudder of a boat or plane, or a nose steering wheel of a plane), a leaning left or right action within a three-dimensional virtual environment, or any other such movement. In some implementations, the movement may be used for navigation between webpages or tabs of a browser, between windows of an application, etc. For example, a user may rotate the controller one way to advance to a next tab and the other way to return to a previous tab.

If the sensor values do not indicate a rotation, then at step 318 in some implementations, the sensor values may be compared to prior values or vectors (e.g. determining an acceleration based on two successive velocity measurements for each sensor). If the velocity is consistent with the prior velocity for each sensor—that is, if the acceleration between successive velocity measurements is less than a threshold for each sensor—then at step 320 in some implementations, an average vector may be determined from the sensors and used for a translation vector of the controller. The translation vector may be provided to a computing device via the interface at step 316. If the velocity for either sensor is not consistent with a prior velocity—that is, if the acceleration between two velocity measurements exceeds a threshold—then the reading may be erroneous, and in some implementations, at step 322, the more consistent velocity measurement or sensor detecting a smaller acceleration between subsequent velocity measurements may be utilized as the translation vector for the controller. This may increase reliability as discussed above, avoiding issues with erroneous readings due to dust or debris on a sensor. The translation vector may be provided to a computing device via the interface at step 316, as discussed above.

Accordingly, the systems and methods discussed herein provide for an advanced computer input device with a rotational degree of freedom ($z_{rot}$) in addition to two translation degrees of freedom (x and y), in an easy and intuitive fashion. A plurality of independent position sensors may be arranged on a lower surface of the computer input device, each determining a direction and velocity of motion of the input device when in use. The detected directions and velocities may be compared to determine whether a rotational motion of the input device has been applied as opposed to (or in addition to) a translation. In some implementations, the additional sensors may also provide greater accuracy for translation detection, for example by averaging sensor data, or by disregarding sensor data that may be erroneous (e.g. a loss of detection of motion during a translation, such as due to dust or debris blocking a sensor).

In one aspect, the present disclosure is directed to a computer input device. The computer input device includes a housing; a communication interface positioned within the housing; a first motion-detecting sensor positioned at a first location on an underside of the housing; a second motion-detecting sensor positioned at a second location on an underside of the housing; and a processor positioned within the housing. The processor is configured to: receive a first signal indicating a first translation detected by the first motion-detecting sensor; receive a second signal indicating a second translation detected by the second motion-detecting sensor; identify, based on the first translation and the second translation, a rotation of the housing; and transmit, via the communication interface to a computing device, a signal comprising the identified rotation.

In some implementations, the first location is in opposition to the second location across a centroid of the underside of the housing. In some implementations, the first motion-detecting sensor and second motion-detecting sensor each comprise an imaging array. In a further implementation, at least one imaging array of the first motion-detecting sensor and the second motion-detecting sensor is an oblong rectangular array. In some implementations, the communication interface comprises a wireless communication interface. In some implementations, the communication interface comprises a wired communication interface.

In some implementations, at least one of the first motion-detecting sensor and the second motion-detecting sensor further comprises an illuminator. In some implementations, the first motion-detecting sensor and the second motion-detecting sensor are configured to detect a translation in an X-Y plane; and wherein the processor is further configured to identify the rotation of the housing around a Z-axis orthogonal to the X-Y plane. In a further implementation, the processor is further configured to identify the rotation of the housing responsive to the first translation having a first direction and the second translation having a second, opposing direction. In another further implementation, the first translation includes a positive X translation and the second translation includes a negative X translation.

In some implementations, the processor is further configured to: receive a third signal indicating a third translation detected by the first motion-detecting sensor; receive a fourth signal indicating a fourth translation detected by the second motion-detecting sensor; identify, based on the third translation and the fourth translation, a lack of rotation of the housing; determine a translation of the housing based on the third translation and the fourth translation; and transmit, via the communication interface to a computing device, a signal comprising the determined translation of the housing. In a further implementation, the processor is configured to identify a lack of rotation of the housing responsive to the third translation and the fourth translation having vectors with directions within a predetermined threshold angle of each other. In another further implementation, the processor is configured to determine a first acceleration between the first translation and the third translation. In a still further implementation, the processor is configured to disregard the third translation responsive to the first acceleration exceeding a threshold. In a yet still further implementation, the processor is configured to determine the translation of the housing corresponds to the fourth translation, responsive to the first acceleration exceeding the threshold. In another further implementation, the processor is configured to determine a second acceleration between the second translation and the fourth translation; and determine the translation of the housing corresponds to an average of the third translation and the fourth translation, responsive to the first acceleration and the second acceleration each being less than a threshold.

In some implementations, the computer input device comprises at least one input button. In some implementations, the computer input device comprises at least one input wheel.

In another aspect, the present disclosure is directed to a method for providing a rotational input signal via a computer input device. The method includes detecting, by a first motion-detecting sensor positioned at a first location on an underside of the computer input device, a first translation in a first direction. The method also includes detecting, by a second motion-detecting sensor positioned at a second location on the underside of the computer input device, a second translation in a second direction. The method also includes calculating a rotation of the computer input device according to the first translation and the second translation, responsive to the first direction opposing the second direction. The method also includes providing, to a computing device, an identification of the rotation of the computer input device.

In some implementations, the method includes detecting, by the first motion-detecting sensor, a third translation in a third direction; detecting, by the second motion-detecting sensor, a fourth translation in a fourth direction; calculating a translation of the computer input device according to the third translation and the fourth translation, responsive to the third direction not opposing the fourth direction; and providing, to a computing device, an identification of the translation of the computer input device.

B. Computing Environment

Having discussed specific embodiments of the present solution, it may be helpful to describe aspects of the operating environment as well as associated system components (e.g., hardware elements) in connection with the methods and systems described herein.

Figure 4A:
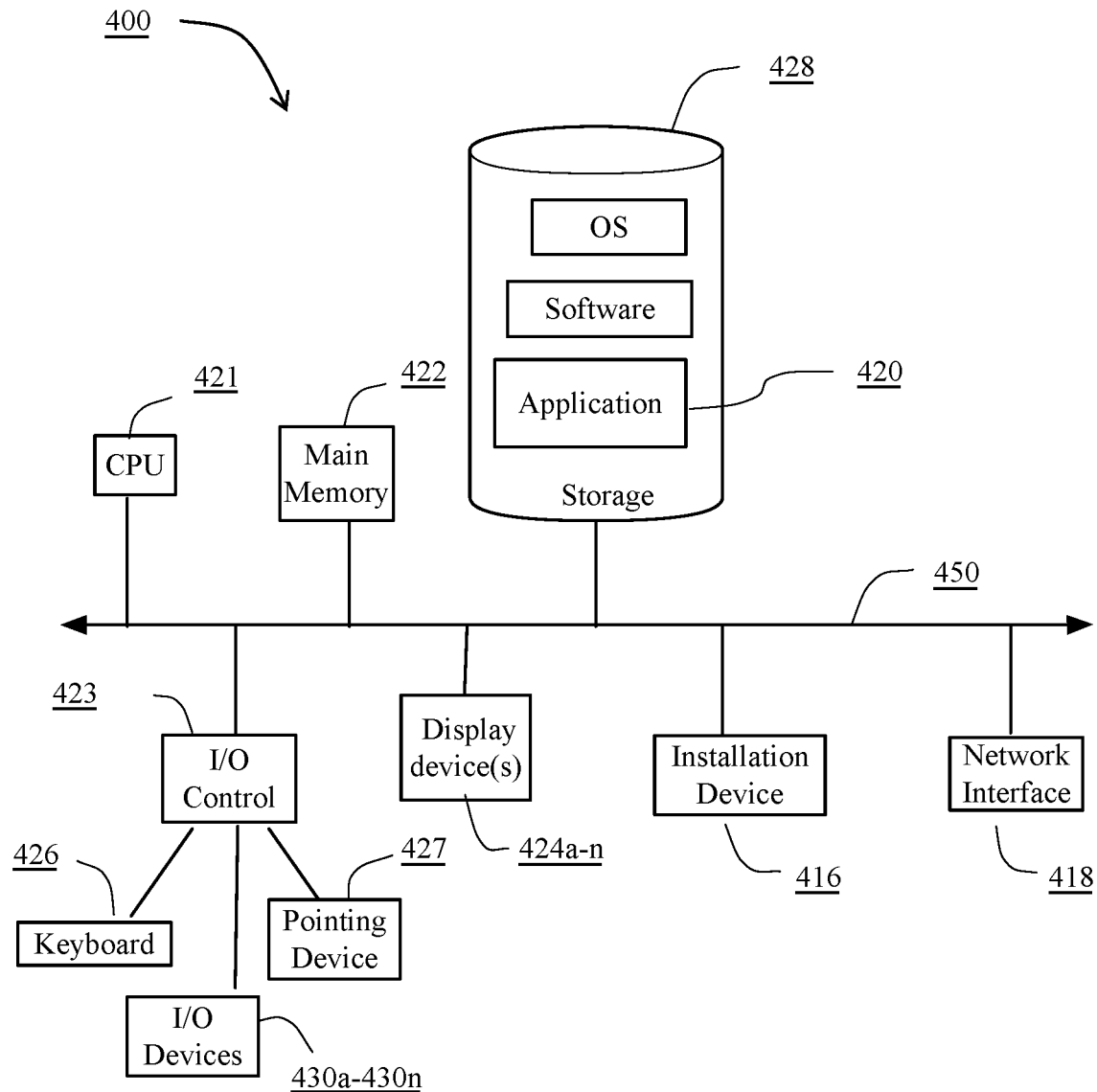
FIGS. 4A and 4B are block diagrams depicting embodiments of computing devices useful in connection with the methods and systems described herein.
Figure 4B:
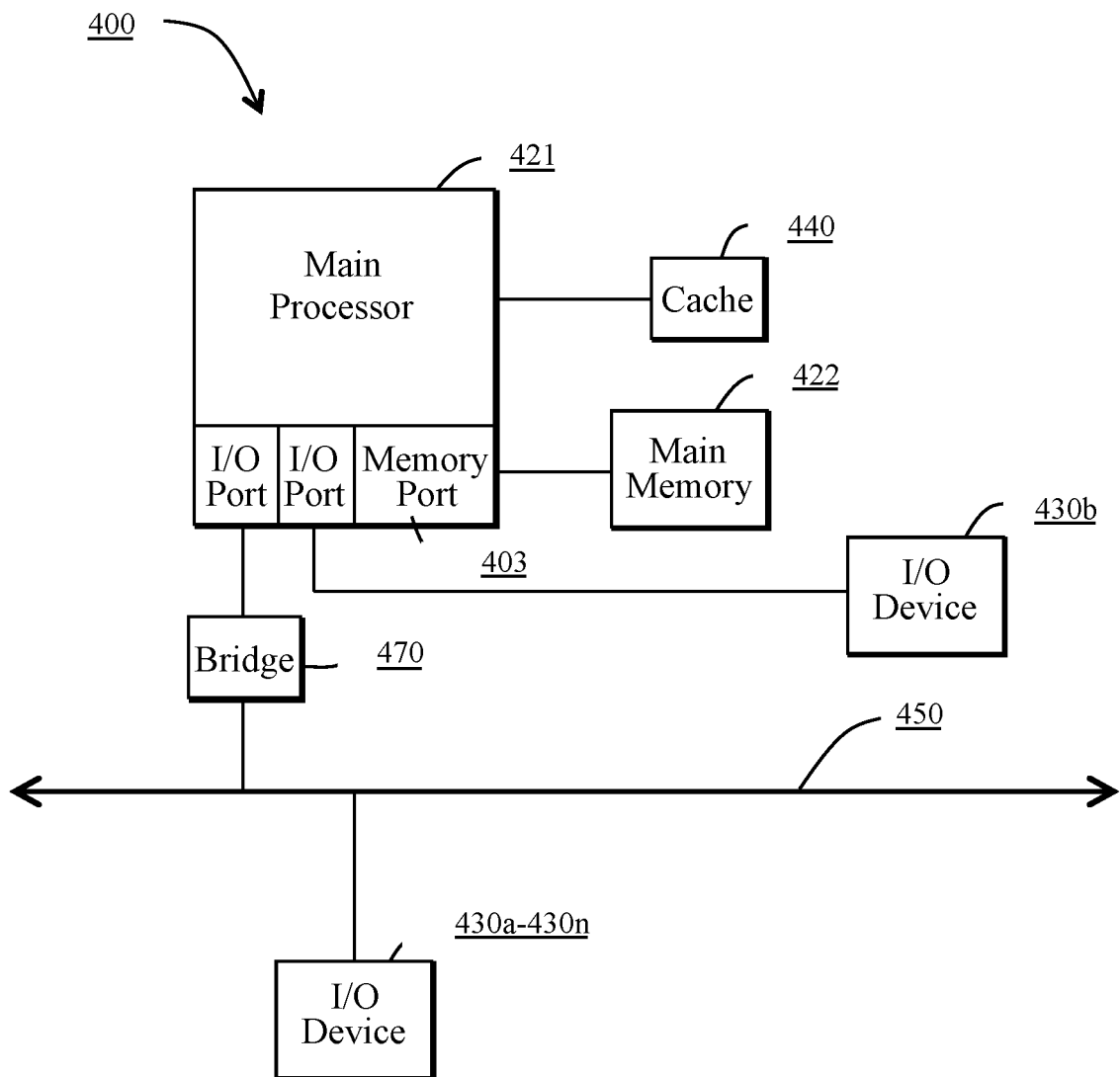

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of the wireless communication devices 402 or the access point 406. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor communicates directly with main memory 422 via a memory port 403. For example, in FIG. 4B the main memory 422 may be DRDRAM.

FIG. 4B depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4B depicts an embodiment of a computer 400 in which the main processor 421 may communicate directly with I/O device 430b, for example via HYPERTRANSPORT, RAPIDIO, or INFINIBAND communications technology. FIG. 4B also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs.

The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A computer input device, comprising:
    a first motion-detecting sensor comprising an oblong rectangular imaging array having a first number of pixels in a first direction a, and a second number of pixels in a second direction b orthogonal to the first direction a, and wherein the first number of pixels is less than the second number of pixels; and
    a second motion-detecting sensor comprising an oblong rectangular imaging array having a third number of pixels in the first direction a and the second number of pixels in the second direction b.

2. The computer input device of claim 1, wherein the first motion-detecting sensor and the second motion-detecting sensor are separated in the first direction a.

3. The computer input device of claim 1, wherein a sum of the first number of pixels and the third number of pixels is equal to or greater than the second number of pixels.

4. The computer input device of claim 1, further comprising a processor configured to:
    receive a first signal from the first motion-detecting sensor indicating no translation in the first direction a;
    receive a second signal from the second motion-detecting sensor indicating a translation in the first direction a; and
    generate an output signal identifying a translation of the computer input device by an amount corresponding to the second signal, the first signal disregarded by the computer input device.

5. The computer input device of claim 4, wherein the second signal indicates a translation corresponding to one pixel.

6. The computer input device of claim 1, further comprising a processor configured to:
receive a first signal from the first motion-detecting sensor indicating a first translation in the first direction a;
receive a second signal from the second motion-detecting sensor indicating a different, second translation in the first direction a; and
generate an output signal identifying a translation of the computer input device by an amount corresponding to an average of the first signal and the second signal, responsive to the first translation and the second translation each being non-zero.

7. The computer input device of claim 6, wherein the processor is further configured to determine an acceleration associated with each of the first translation and the second translation, and generate the output signal identifying a translation of the computer input device by the amount corresponding to the average of the first signal and the second signal, responsive to each of the accelerations being less than a threshold.

8. The computer input device of claim 1, further comprising a processor configured to:
receive a first signal from the first motion-detecting sensor indicating a first translation in the first direction a;
receive a second signal from the second motion-detecting sensor indicating a different, second translation in the first direction a;
exclude the first signal; and
generate an output signal identifying a translation of the computer input device by an amount corresponding to the second signal.

9. The computer input device of claim 8, wherein the processor is configured to exclude the first signal responsive to an acceleration associated with the first translation exceeding a threshold.

10. The computer input device of claim 8, wherein the processor is configured to exclude the first signal responsive to a difference between an acceleration associated with the first translation and an acceleration associated with the second translation exceeding a threshold.

11. The computer input device of claim 1, further comprising a processor configured to:
receive a first signal indicating a first translation detected by the first motion-detecting sensor;
receive a second signal indicating a second translation detected by the second motion-detecting sensor; and
generate an output signal identifying a rotation of the computer input device based on the first translation and second translation.

12. The computer input device of claim 11, wherein the processor is further configured to:
generate the output signal identifying no rotation of the computer input device, responsive to a difference between the first translation and the second translation being less than a threshold.

13. A computer input device, comprising:
a first motion-detecting sensor;
a second motion-detecting sensor; and
a processor configured to:
receive a first signal indicating a first translation detected by the first motion-detecting sensor,
receive a second signal indicating a second translation detected by the second motion-detecting sensor,
identify, based on the first translation and the second translation, a rotation of the computer input device,
determine that the identified rotation of the computer input device is less than a threshold angle, and
responsive to the determination that the identified rotation is less than the threshold angle:
calculate a translation of the computer input device based on the first translation and the second translation, and
transmit, via a communication interface to a computing device, a signal comprising the determined translation of the computer input device.

14. The computer input device of claim 13, wherein the processor is configured to calculate the translation of the computer input device by:
determining that an acceleration of the first translation exceeds a threshold acceleration; and
calculating the translation of the computer input device as corresponding to the second translation, responsive to the acceleration of the first translation exceeding the threshold acceleration.

15. A computer input device, comprising:
a first motion-detecting sensor;
a second motion-detecting sensor; and
a processor configured to:
receive a first signal indicating a first translation detected by the first motion-detecting sensor,
receive a second signal indicating a second translation detected by the second motion-detecting sensor,
disregard one of the first signal and the second signal, and
transmit, via a communication interface to a computing device, a signal identifying a translation of the computer input device based on the non-disregarded one of the first signal and the second signal;
wherein the processor is configured to disregard the first signal responsive to the first translation being associated with an acceleration exceeding a threshold.

16. The computer input device of claim 15, wherein the processor is configured to determine the acceleration associated with the first translation based on a series of translation signals including the first signal.

17. A computer input device, comprising:
a first motion-detecting sensor;
a second motion-detecting sensor; and
a processor configured to:
receive a first signal indicating a first translation detected by the first motion-detecting sensor;
receive a second signal indicating a second translation detected by the second motion-detecting sensor;
identify, based on the first translation and the fourth second translation, a rotation of the computer input device; and
transmit, via the communication interface to the computing device, a signal comprising the identified rotation.

18. A computer input device, comprising:
a first motion-detecting sensor;
a second motion-detecting sensor;
wherein the first motion-detecting sensor and the second motion-detecting sensor are configured to detect a translation in an X-Y plane; and
a processor configured to identify rotation of the computer input device around a Z-axis orthogonal to the X-Y plane, based on a first signal indicating a first translation detected by the first motion-detecting sensor and a second signal indicating a second translation detected by the second motion-detecting sensor.

19. The computer input device of claim 15, wherein the first motion-detecting sensor comprises an oblong rectangular imaging array having a first number of pixels in a first direction a, and a second number of pixels in a second direction b orthogonal to the first direction a, and wherein the first number of pixels is less than the second number of pixels; and the second motion-detecting sensor comprises an oblong rectangular imaging array having a third number of pixels in the first direction a and the second number of pixels in the second direction b.

* * * * *